(12) United States Patent
Lang et al.

(10) Patent No.: US 12,466,418 B2
(45) Date of Patent: Nov. 11, 2025

(54) METHOD FOR OPERATING A CONTROL DEVICE FOR A MOTOR VEHICLE

(71) Applicant: AUDI AG, Ingolstadt (DE)

(72) Inventors: Johannes Lang, Poxdorf (DE); Claudia Tischendorf, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 243 days.

(21) Appl. No.: 18/303,994

(22) Filed: Apr. 20, 2023

(65) Prior Publication Data

US 2023/0406333 A1    Dec. 21, 2023

(30) Foreign Application Priority Data

Apr. 21, 2022 (DE) ...................... 10 2022 109 637.8

(51) Int. Cl.
*B60W 50/06* (2006.01)
*B60W 50/14* (2020.01)
(Continued)

(52) U.S. Cl.
CPC ............ *B60W 50/06* (2013.01); *B60W 50/14* (2013.01); *G06F 8/62* (2013.01); *H04W 76/10* (2018.02)

(58) Field of Classification Search
CPC ......... B60W 50/06; B60W 50/14; G06F 8/62; H04W 76/10; G06Q 10/20; B60R 16/037
See application file for complete search history.

(56) References Cited

U.S. PATENT DOCUMENTS 7,039,515 B2 * 5/2006 Eich ..................... F16H 61/12
701/33.7
11,163,543 B2  11/2021 Eyl et al.
(Continued)

FOREIGN PATENT DOCUMENTS

DE    112014006613 T5    1/2017
DE    102019108602 A1    10/2020
(Continued)

OTHER PUBLICATIONS

Morooka Yasuo, Jul. 24, 2001, English Machine Translation_JP2003034200A provided by Patent Translate by EPO and Google (Year: 2001).*

*Primary Examiner* — Ashley L Redhead, Jr.
(74) *Attorney, Agent, or Firm* — Sterne, Kessler, Goldstein & Fox P.L.L.C,

(57) ABSTRACT

The present disclosure relates to a method for operating a control device for a motor vehicle, and to the motor vehicle. The method comprises the following steps: determining usage data that describes a usage behavior for a respective function that can be provided by a first software provided to the control device; checking, for the respective function, whether the usage is below a predetermined minimum usage according to the determined usage data; for each function for which it has been determined, upon checking, that the usage is below the predetermined minimum usage, providing a removal option for at least partially removing the function from the control device; in the event that the provided removal option is activated, provide a second software for the control device by means of which the respective removed function is not executable; and operating the control device by means of the provided second software.

10 Claims, 2 Drawing Sheets

(51) Int. Cl.
  *G06F 8/61* (2018.01)
  *H04W 76/10* (2018.01)

(56) References Cited

U.S. PATENT DOCUMENTS

| | | |
|---|---|---|
| 2002/0070976 A1 | 6/2002 | Tanner et al. |
| 2005/0027846 A1 | 2/2005 | Wolfe et al. |
| 2006/0048139 A1 | 3/2006 | Nakamura |
| 2007/0287439 A1* | 12/2007 | Weyl .................. G06F 8/65 |
| | | 455/420 |
| 2010/0017505 A1 | 1/2010 | Kamada et al. |
| 2013/0103236 A1* | 4/2013 | Mehrgan .................. B60Q 1/00 |
| | | 705/13 |
| 2014/0245286 A1 | 8/2014 | Wong et al. |
| 2016/0357545 A1 | 12/2016 | Linn et al. |
| 2017/0017497 A1 | 1/2017 | Shimada et al. |
| 2018/0018158 A1 | 1/2018 | Kalke et al. |
| 2018/0272964 A1* | 9/2018 | Netter .................. G06F 8/65 |
| 2021/0103436 A1* | 4/2021 | Thurimella .............. G06F 8/65 |

FOREIGN PATENT DOCUMENTS

| | | | |
|---|---|---|---|
| JP | 2003034200 A | * | 2/2003 |
| WO | WO 2017/036551 A1 | | 3/2017 |

\* cited by examiner

METHOD FOR OPERATING A CONTROL DEVICE FOR A MOTOR VEHICLE

TECHNICAL FIELD

The present disclosure relates to a method for operating a control device for a motor vehicle. In addition, the present disclosure relates to a motor vehicle which is designed to implement the steps of such a method as provided for a motor vehicle.

BACKGROUND

A motor vehicle can have a control device in which software is provided upon the execution of which a function of the motor vehicle can be provided. Such a function is, for example, a comfort function. The comfort function may, for example, be a weather service that provides information about the weather in an environment of the motor vehicle, and/or a parking space information service that provides information about a free parking space at a destination of the motor vehicle. As an alternative or in addition to this, the function can be driving-related, such as a driver assistance system, for example.

DE 11 2014 006 613 T5 shows a user interface that comprises a function means storage portion that stores candidates for a plurality of functions and for a plurality of operating means for outputting an instruction to execute functions; an estimating portion that estimates a function that is intended by the user and the operating means under the stored candidates, based on information linked with a current situation; and a presentation portion for presenting the candidate for the function, estimated by the estimation portion, together with the candidate for the operating means.

It is the object of the present disclosure to provide a solution by means of which a control device for a motor vehicle can be efficiently operated.

BRIEF DESCRIPTION OF DRAWINGS/FIGURES

Figure 1:
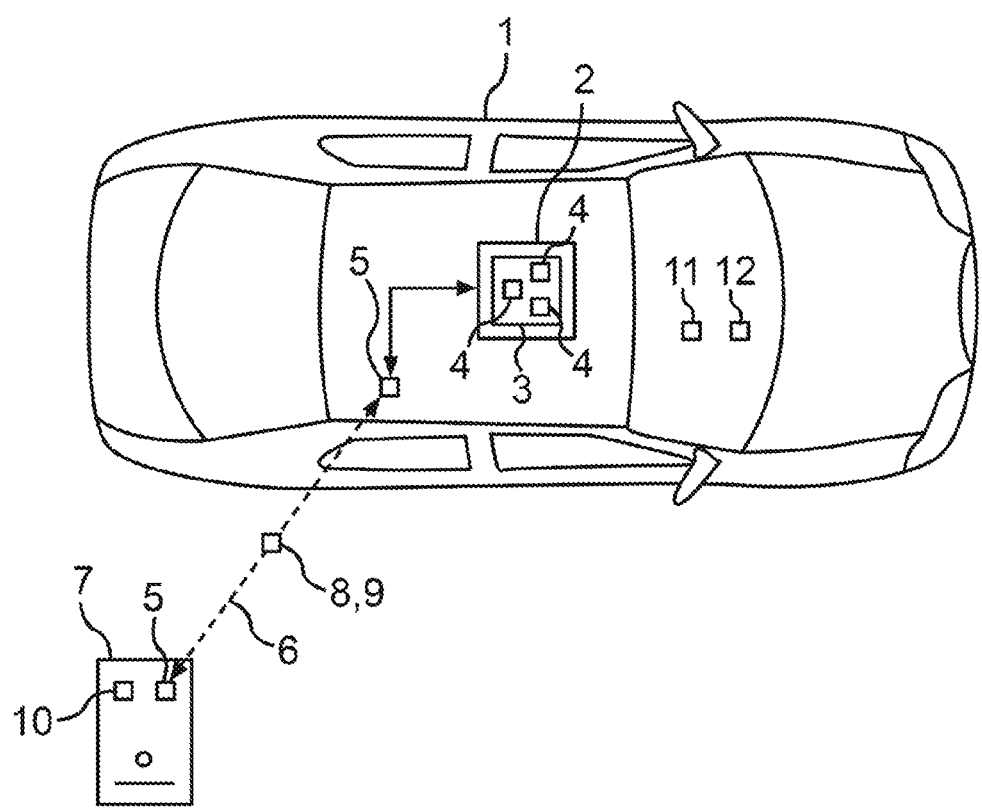
Figure 2:
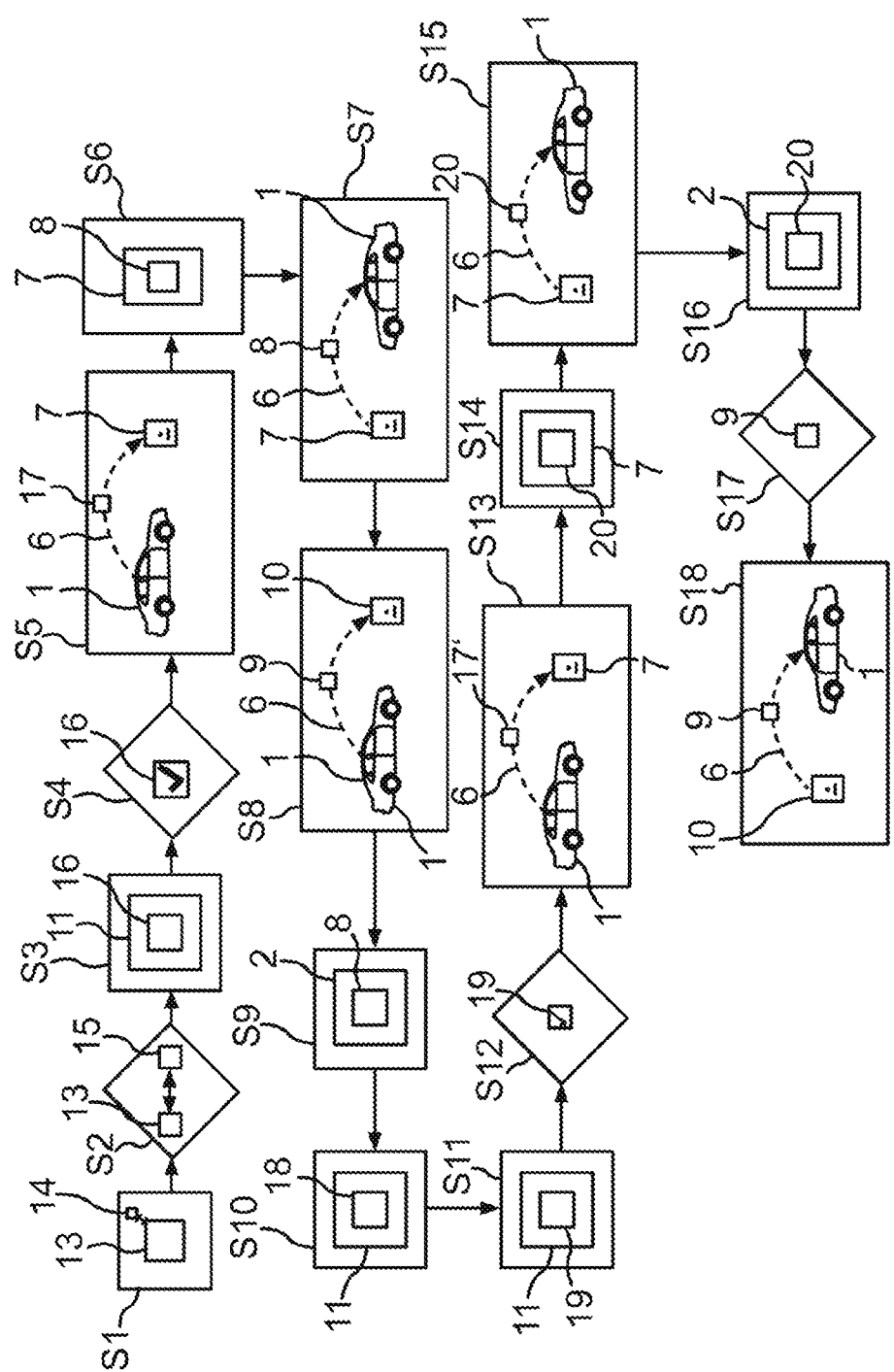

FIG. 1 shows a schematic representation of a motor vehicle with a control device; and FIG. 2 shows, in schematic representation, a signal flow chart for a method for operating the control device of the motor vehicle.

DETAILED DESCRIPTION

The object is achieved by the objects of the independent claims. Possible embodiments of the present disclosure are specified in the dependent claims, the following description, and figures.

A first aspect of the present disclosure relates to a method for operating a control device for a motor vehicle. The control device is, for example, a central computing unit in the motor vehicle. In the control device, a first software is provided by means of which at least one function for the motor vehicle can be executed. The function is, for example, a comfort function, in particular a comfort function with a navigation and/or location reference, for example a weather service that provides information about the weather in an environment of the motor vehicle, and/or a parking space information service that provides information about a free parking space at a destination of the motor vehicle. As an alternative or in addition to this, the function can relate to an air conditioner, a heater, in particular a seat heater, and/or a multimedia device of the motor vehicle. The function is preferably a function which must be actively activated by a user of the motor vehicle, such as a driver. The function is preferably not system-relevant to the motor vehicle, i.e., it is preferably not absolutely required by the motor vehicle in order to provide a driving function of the motor vehicle.

The present disclosure is based on the realization that a number of functions provided by means of the first software, as well as their respective scope, are limited in terms of hardware by a storage of the control device. In addition, in the event of a large number of functions a processor load of the control device can be used to capacity in the event that, for example, at least one of the functions is continuously activated as a background function, so that, for example, insufficient processor capacity can be made available for the activation of a further function. It can therefore be reasonable to check, and optionally to reduce, the number and/or the scope of functions that are provided by means of the first software.

In a first method step, a determination of usage data takes place, which usage data describe a usage behavior for a respective function that can be provided by the first software provided to the control device. The usage data can, for example, describe how often the function was used in a predetermined time interval. As an alternative or in addition to this, the usage data can describe only whether the respective function was used at least once or not. The benefit of the function comprises, for example, an activation, usage, and/or deactivation of the function by the user of the motor vehicle. The usage behavior thus specifies a usage of the respective function in the motor vehicle. The determination of the usage data can take place by means of the control device.

A further method step provides a checking for the respective function, wherein the checking can take place by means of the control device. It is hereby checked whether the usage is within a predetermined minimum usage, according to the determined usage data. The predetermined minimum usage can provide, for example, that the function was used at least once in the past. If, for example, the function has never been used before, its usage data describe a usage which, for example, is below the predetermined minimum usage. In this event, the checking for the respective function would be successful. However, if the function has been used several times in the past, the usage data can describe a usage that is above the minimum usage. In this event, the check would be unsuccessful, i.e., the checking would have a negative result.

For each function for which it has been determined, upon checking, that the usage is below the predetermined minimum usage, a removal option for at least partially removing the function from the control device is provided. Thus, if the checking was successful, the removal option is output, for example, as an instruction in the motor vehicle. The removal option can be, for example, a visually perceptible and/or acoustically perceptible message which is provided by means of an output device in the motor vehicle. The output device can, for example, be a display device, such as a screen, in particular a touch-sensitive screen, and/or a loudspeaker device in the motor vehicle which comprises at least one loudspeaker. The output device can be a component of the motor vehicle, and/or a component of a mobile terminal which is positioned in the motor vehicle. As an alternative or in addition to this, the removal option can be provided by means of the output device of the mobile terminal independently of position i.e., for example outside of the motor vehicle. In this event, an application can be installed on the mobile terminal via which a user profile of the user is managed for the motor vehicle. The mobile terminal is, for example, a smartphone and/or a tablet.

The removal from the control device provides at least that the function can no longer be executed by means of the control device after removal. However, it can still be stored in the control device that the function exists in principle. Therefore, the function can be only partially removed since, for example, a reference to the function can continue to be stored in the control device, but not a software module required for executing the function.

In the event that the available removal option is activated, a second software is provided for the control device, by means of which the respective removed function is not executable. Instead of the first software, the second software is loaded onto the control device so that the control device is only operated further by means of the provided second software, and no longer by means of the first software. The first and second software are different from one another. The two softwares thus differ from one another in at least one software module. The activation of the removal option is preferably performed manually by the user of the motor vehicle. To activate the removal option, an actuating device can be provided, such as a button, a switch, a rotary push-button switch, and/or an element on the touch-sensitive screen. As an alternative or in addition to this, the actuation device can be actuated by a voice control based on a microphone device with at least one microphone in the motor vehicle, and/or by a gesture control based on a camera device with at least one camera in the motor vehicle. The actuating device can be a component of the motor vehicle and/or a component of the mobile terminal. The actuating device can be associated with the output device and/or comprised be by this.

Thus, in the motor vehicle with the second software a new software is provided according to which the function that is no longer desired is no longer provided, since it has been removed from the software, for example. For example, free storage space is hereby is obtained in the control device, which can be used, for example, for new functions for the motor vehicle and/or for a software update of the second software. Moreover, the processor load of the control device can hereby be reduced since, for example, the removed function is no longer executed in the background by the control device. Ultimately, a particularly advantageous storage resource control and utilization distribution for the control device of the motor vehicle is hereby achieved. The control device is thus operated efficiently for the motor vehicle.

It can be provided that the activation of the removal option takes place automatically so that no manual contribution to activating the removal option is required by the user of the motor vehicle. However, it is preferably provided that the user can actively decide whether they wish to accept the removal option, that is to say whether the at least one function is to be removed or not.

One embodiment provides that a communication connection is established between a communication interface of the motor vehicle and a communication interface of an external computing device. The communication connection is preferably not a cabled communication connection, in particular is a wireless communication connection. The communication connection between the motor vehicle and the external computing device can be provided via a wireless local area network (WLAN), a Bluetooth connection, and/or a mobile data network, for example based on the Long Term Evolution (LTE), Long Term Evolution Advanced (LTE-A), Fifth Generation (5G), or Sixth Generation (6G) mobile communications standard. The external computing device can alternatively be referred to as a backend or server. The external computing device is arranged outside of the motor vehicle.

Request data describing the activated removal option are transmitted to the external computing device via the established communication connection. The request data describe which function is no longer desired for the control device according to the activated removal option, that is to say which functions are to be removed. The request data comprises a request to the external computing device to provide a new software, that is to say the second software, wherein the second software was generated according to the specifications of the activated removal option. Alternatively, the request data can be referred to as data describing the activated removal option. The second software generated according to the determined request data is thereupon received by the motor vehicle via the established communication connection. The motor vehicle thus sends the request data to the external computing device; the external computing device can receive the request data and thereupon transmit the second software to the motor vehicle. It is ultimately ensured that the second software can be provided in the motor vehicle without large expenditure of resources, since the external computing device is involved.

An additional embodiment provides that the second software is generated by means of the external computing device. The external computing device can have a software generation algorithm, for example, wherein the second software can be provided on the basis of the received request data. Changes are preferably made automatically in a program code of the first software to generate the second software. The second software is in particular compiled, i.e., can be executed as a software block. Therefore, the function that is no longer desired and is to be removed is not simply deleted only in the control device of the motor vehicle, but rather a new software for the control device which comprises all the functions still present for the control device is actually generated and provided. As a result, it can hereby be reliably achieved that the second software ultimately operated by the control device has been reliably generated and can therefore actually be executed.

As an alternative or in addition to this, it can be provided that the control device of the motor vehicle generates the second software itself.

A further embodiment provides that the determined usage data describe the usage behavior during a predetermined time interval. The time interval can be, for example, one month, three months, or half a year. As an alternative or in addition to this, a smaller time interval, for example of one, two, or three weeks, or a greater time interval, for example of one year, two years, or three years, is possible. Alternatively, an arbitrary time interval between the stated values can be selected.

The time interval is in particular function-dependent. It can therefore be provided that the time interval depends on the function for which the usage data are determined. This is reasonable in particular in the case of seasonal functions which, for example, relate to the climate control system or the heating in the motor vehicle. If, for example, the usage behavior of a function for controlling the seat heater of a vehicle seat of the motor vehicle is checked, due to seasonal fluctuations in the usage behavior of the seat heater it can be expedient to consider a longer time interval, for example an entire year, in comparison to a function that is independent of the season, such as the weather service. Alternatively or in addition to a length of the time interval, the time interval can be limited to predefined months and/or seasons. In the cited example, the usage data can then be determined only on the basis of the usage in winter months. Ultimately, in the control device individual time intervals can be predefined for each function for which the usage behavior is respectively evaluated to provide the usage data.

In one embodiment, it can be provided that the function for removal is uninstalled by the control device. It can therefore be provided that the function is completely uninstalled so that, with the second software, there is no longer the capability that the function can be executed. In the uninstallation, it can also be provided that information about a previous use of the function is also deleted. Ultimately, a state is thereby achieved according to which it is assumed that the function is not provided in the motor vehicle and/or was never provided in the motor vehicle. In this way, a particularly large amount of storage space can be freed up in the memory of the control device.

Moreover, an embodiment provides that content data that were generated upon use of the function are stored in a storage device before the uninstallation. It can therefore be provided that operational data are secured for the function before the uninstallation of the function in the control device takes place. The storage device is, for example, an external storage device which is arranged outside of the motor vehicle. The storage device can be comprised by the external computing device. In this event, the content data can, for example, be transmitted between the motor vehicle and the external computing device, to said external computing device, via the communication connection. The content data describe, for example, the previous usage behavior of the function, such as user-specific settings, preferences, and/or a usage history. It can hereby be ensured that no private data, and no data that will possibly be of interest again in the future, are lost due to the uninstallation. This can be perceived by the user as particularly comforting.

According to one embodiment, it is provided that a functional overview for a user of the motor vehicle is provided in which the removed function is characterized as a currently removed function. The functional summary can, for example, be displayed as a list on the screen as an output device. The functional overview can, for example, have all actually provided and all removed functions of the control device. The removed functions are hereby preferably characterized as such, for example in that they visually highlighted, visually contrasted, and/or marked in color. In the event that they are shown visually contrasted, they can, for example, be visually more difficult to recognize, for example via presentation in a color that is lighter compared to the provided functions. It is hereby signaled that the respective removed function exists per se, but is currently not provided in the motor vehicle and is thus available.

An installation option for installing the function on the control device is provided for the currently removed function. The installation option can, for example, be provided by means of the output device and be selected, i.e., manually activated, by means of the actuating device. Upon activation of the installation option, a third software for the control device is provided by means of which the function that is currently removed and which is to be installed again according to the installation option can be executed. After detecting the activation of the installation option, this information can therefore be transmitted as new request data to the external computing device, whereupon said external computing device latter generates the third software and transmits this to the motor vehicle. The third software is different than the second software. The control device is thereupon operated according to the third software. In this event, the third software replaces the second software. It is thus possible that uninstalled functions can be reinstalled again at any time. Of course, this requires that sufficient resources are provided in the control device, that is, the free storage space of the storage and/or the processor load of the control device permit this. It is hereby ensured that uninstalling, and thus removing, individual functions can be reversed again, and therefore the user is not faced with an absolute decision when they are confronted by the removal option.

In one embodiment, it can be provided that it is checked whether content data have been stored with regard to the function that is executable again according to the third software. If this is so, i.e., if content data were stored in the storage device for this function, the stored content data are provided by the storage device for the control device. They can therefore be transmitted, for example via the communication connection, from the storage device to the motor vehicle, and thus be loaded again into the control device. They can then be stored, for example, in a storage device of the control device. The user-specific information which had been saved with regard to the function before it was uninstalled can thus be loaded back into the motor vehicle. The previously removed function can be executed again completely and taking into account the user-specific data already known for the function, which the user can perceive as particularly comforting.

A further aspect of the present disclosure relates to a motor vehicle with a control device. The motor vehicle is designed to implement the steps of the method provided for the motor vehicle, as was described above. The motor vehicle according to the present disclosure is preferably designed as an automobile, in particular as a passenger car or a truck, or as a passenger bus or a motorcycle.

Furthermore, a system made up of the motor vehicle and the external computing device can be provided. This system of motor vehicle and external computing device is then designed to implement the method described above.

The present disclosure also includes further embodiments of the motor vehicle and system according to the present disclosure, which embodiments comprise features as have already been described in conjunction with the embodiments of the method according to the present disclosure. For this reason, the corresponding embodiments of the motor vehicle and system according to the present disclosure are not described again here.

The present disclosure also includes the control device for the motor vehicle. The control device can have a data processing device or a processor device which is configured to implement an embodiment of the method according to the present disclosure. For this purpose, the processor device can have at least one microprocessor, and/or at least one microcontroller, and/or at least one FPGA (field programmable gate array), and/or at least one DSP (digital signal processor). Furthermore, the processor device can comprise program code which, when executed by the processor device, is configured to implement the embodiment of the method according to the present disclosure. The program code can be stored in a data storage device of the processor unit.

As a further achievement, the present disclosure also comprises a computer-readable storage medium comprising instructions which, upon executed by a computer or a computer network, cause this to execute an embodiment of the method according to the present disclosure. The storage medium can, for example, be configured at least in part as a non-volatile data storage (e.g., as flash memory and/or as an SSD—solid state drive) and/or at least in part as a volatile data storage (e.g., as a RAM—random access memory). A processor circuit with at least one microprocessor can be provided by the computer or computer network. The commands can be provided as binary code or assembly, and/or as a source code of a programming language (e.g., C).

The present disclosure also comprises the combinations of the features of the described embodiments. The present disclosure therefore also comprises implementations which each have a combination of the features of a plurality of the described embodiments, provided the embodiments have not been described as mutually exclusive.

The exemplary embodiments described below are preferred embodiments of the present disclosure. In the exemplary embodiments, the described components of the embodiments each represent individual features of the present disclosure that are to be considered independently of one another, each also further developing the present disclosure independently of one another. For this reason, the disclosure is also intended to include other combinations of the features of the embodiments than those described. Additionally, the described embodiments can also be complemented by additional, already described features of the present disclosure.

In the figures, the same reference signs refer to functionally identical elements.

In FIG. 1, a motor vehicle 1 is depicted that has a control device 2. In the control device 2, a first software 3 is provided which, for example, enables an execution of at least one function 4 of the motor vehicle 1, in particular of a plurality of functions 4. Here, three functions 4 which are provided by the first software 3 are drawn purely by way of example. The respective function 4 can be a comfort function, for example relating to a voice assistant, a navigation system, a climate control system, and/or a multimedia system of the motor vehicle 1. The respective function 4 can also be a driving-relevant and/or safety-relevant function 4 for the motor vehicle 1. In the following, focus can be placed on function 4 which is purely a comfort function and can therefore in principle be removed from the control device 2 without impairing the functionality of the motor vehicle 1 as a means of transportation.

The motor vehicle 1 has a communication interface 5 by means of which a communication connection 6 can be established to a communication interface 5 of an external computing device 7. The communication connection 6 is, for example, not a cabled connection, and in particular is a wireless connection. For example, a second software 8 can be transmitted from the external computing device 7 to the motor vehicle 1 via the communication connection 6, and/or content data 9 can be transmitted from the motor vehicle 1 to, for example, a storage device 10 of the external computing device 7. The external computing device 7 is a backend and/or a server, for example.

The motor vehicle 1 can have an output device 11 which can, for example, be designed as a screen, in particular as a touch-sensitive screen, and/or as a loudspeaker device with at least one loudspeaker. The motor vehicle 1 can furthermore have an actuating device 12 such as, for example, a button, a switch, a rotary push-button switch, an element on the touch-sensitive screen, a voice input system based on a microphone device which has at least one microphone and is designed to detect a voice input of a user of the motor vehicle 1, and/or a gesture recognition system based on a camera device with at least one camera for detecting a gesture of the user. The output device 11 and/or the actuating device 12 can be components of the motor vehicle 1. As an alternative or in addition to this, they can be comprised by a mobile terminal which is associated with the user of the motor vehicle 1. The mobile terminal can be positioned in the motor vehicle 1 and/or be linked to a user profile of the user of the motor vehicle 1 via an application. The mobile terminal is, for example, a smartphone or a tablet. An output to and a manual reaction of the user in the context of the method described below take place via the output device 11 or the actuating device 12.

A method for operating the control device 2 for the motor vehicle 1 is outlined in FIG. 2. A determination of usage data 13 which describe a usage behavior for each of the functions 4 takes place in a method step S1. The usage data 13 consequently indicate how often the function 4 was used, for example in a predetermined time interval 14. The time interval 14 is, for example, one month, three months, six months, or one year. The determined usage data 13 therefore describe the usage behavior of the respective function 4 during the predetermined time interval 14, wherein the time interval 14 can be selected depending on a function. The usage data 13 are provided for all functions 4 which can be provided by the first software 3 provided to the control device 2, that is to say for the functions 4 which can be provided and thus executed by the control device 2 in the motor vehicle 1.

In a method step S2, for the respective function 4 a check is made as to whether the usage is below a predetermined minimum usage 15 according to the determined usage data 13.

For each function 4 for which it was determined, upon checking in method step S2, that the usage is below the predetermined minimum usage 15, a removal option 16 for at least partially removing the function 4 from the control device 2 is provided in a method step S3. The minimum usage 15 can be, for example, at least one usage. In this instance, only the function 4 that was not used at all is encompassed by the removal option 16. As an alternative or in addition to this, a higher minimum usage 15 can be selected, so that the function 4 needed to be used, for example, at least three times or five times within the time interval 14, and it is encompassed by the removal option 16 only if this is not so. The removal option 16 is displayed so as to be visually visible, and/or output so as to be acoustically perceptible, for the user of the motor vehicle 1 by means of the output device 11.

The removal option 16 can thereupon be activated manually by the user by means of the actuating device 12. In a method step S4, it is checked whether the provided removal option 16 has been activated. If this is so, for example, a transmission of request data 17, said request data describing the activated removal option 16, from the motor vehicle 1 to the external computing device 7 can take place via the communication connection 6 in a method step S5. For this purpose, it can be provided that the communication connection 6 is first established between the communication interface 5 of the motor vehicle 1 and the communication interface 5 of the external computing device 7.

In a method step S6, the second software 8 is thereupon generated by means of the external computing device 7. Upon applying the second software 8, the respective removed function 4 is not executable. The second software 8 thus differs from the first software 3 in that it no longer comprises the function 4 as is no longer desired according to the removal option 16. The function 4 that is to be removed is therefore then no longer part of a functionality of the motor vehicle 1 as soon as the control device 2 is operated by means of the second software 8. In a method step S7, the second software 8 generated by the external computing device 7 can be transmitted from the external computing device 7 to the motor vehicle 1 via the communication connection 6.

In a method step S8, a transmission of the content data 9 from the motor vehicle 1 to the storage device 10, which here is a component of the external computing device 7, can take place via the communication connection 6. As an alternative or in addition to this, the storage device 10 can be a device spatially separate from the external computing device 7, which spatially separate device can be arranged in the motor vehicle 1 or external to the motor vehicle 1. In this instance, the communication connection 6 can be established directly between the motor vehicle 1 and a communication interface 5 of the storage device 10. The content data 9 were generated given a previous usage of the function 4, and are stored and thus saved via the transmission to the storage device 10 in the storage device 10 before their removal.

In a method step S9, the control device 2 is operated according to the second software 8. Therefore, the second software 8, which no longer has the function 4 to be removed, is loaded onto the control device 2 instead of the first software 3, so that said control device 2 is now operated further only according to the second software 8. This has the effect that the function 4 has ultimately been uninstalled from the control device 2. However, as already described, the content data 9 with regard to this function 4 can have been stored in the storage device 10 in method step S8.

In a method step S10, a functional overview 18 for the user of the motor vehicle 1 is provided. For example, this takes place by means of the output device 11. The removed function 4 is marked as such in the functional overview 18. The functional overview 18 is preferably an overview of all currently available functions 4, as well as all functions 4 that can be provided in principle in the motor vehicle 1 but are currently removed. In a method step S11, an installation option 19 for the currently removed function 4 can be provided by means of the output device 11. The installation option 19 is intended to re-install the function 4 on the control device 2, i.e., the previously removed function 4 can be provided again for the control device 2 upon activation of the installation option 19.

In a method step S12, it can therefore be checked whether the installation option 19 has been activated. If this is so, a transmission of new request data 17' which describe the activated installation option 19 takes place, for example in a method step S13, from the motor vehicle 1 to the external computing device 7. In a method step S14, by means of the external computing device 7, a third software 20 can thereupon be generated, upon the application of which the re-desired function 4 according to the installation option 19 is executable again. The third software 20 differs at least partially from the second software 8. In a method step S15, the third software 20 can be transmitted from the external computing device 7 to the motor vehicle 1 via the communication connection 6. In a method step S16, the control device 2 of the motor vehicle 1 can now be operated according to the third software 20.

In a method step S17, it can be checked whether previous content data 9 have been stored for the function 4 which is executable again according to the third software 20. If this is so, it can be provided in a method step S18 that the content data 9 stored in the storage device 10 are transmitted via the communication connection 6 to the motor vehicle 1, and thus are provided to the control device 2, for example for performing the function 4 according to the content data 9 now provided again.

Overall, the examples show the enabling of resources by installing a selected or multiple selected functions 4 based on the usage behavior of functions 4. For this purpose, a monitoring of the vehicle usage behavior takes place, that is to say the determination and checking of the usage data 13. This can be evaluated in the external computing device 7 and/or can take place in the control device 2. Over a time span that is to be freely defined, that is to say over the time interval 14, unused functions 4 are offered to the user for uninstallation, specifically by means of the removal option 16. Upon deciding for removal, the functions 4—such as a weather service or information about free parking spaces at a destination of the navigation system—can be uninstalled. Resources of the control device 2 are then available for new functions 4 which, for example, can be introduced into the motor vehicle 1 via an update. However, assuming that the resources are available for this purpose, the uninstalled function 4 can be reinstalled at any time, that is to say it can be reloaded into the motor vehicle 1, that is to say to the control device 2 of the motor vehicle 1, via the installation option 19 and the third software 20.

The invention claimed is:

1. A method for operating a control device for a motor vehicle, the method comprising:
   determining usage data describing a usage behavior for a function of a plurality of functions using a first software provided to the control device;
   checking, whether the usage data for the function is below a predetermined minimum usage based on the determined usage data;
   based on the determining, using the checking, that the usage data for the function is below the predetermined minimum usage, providing a removal option for removing the function from the control device;
   uninstalling the function for removal of the function from the control device;
   in response to activating the removal option, providing a second software for the control device having a respective removed function in a non-executable state; and
   operating the control device using the second software.

2. The method of claim 1, further comprising:
   establishing a communication connection between a communication interface of the motor vehicle and a communication interface of an external computing device;
   transmitting request data describing the activated removal option via the communication connection to the external computing device; and
   receiving, by the motor vehicle, the second software generated based on the transmitted request data.

3. The method of claim 2, further comprising, generating the second software using the external computing device.

4. The method of claim 1, further comprising describing the usage behavior during a predetermined time interval by the determined usage data, wherein the predetermined time interval is function-dependent.

5. The method of claim 1, further comprising storing content data generated in response to use of the function in a storage device before the uninstallation.

6. The method of claim 1, further comprising:
   providing, to a user of the motor vehicle, a functional overview in which the removed function is marked as a currently removed function;
   providing, for the currently removed function, an installation option for installing the removed function on the control device;
   providing a third software for the control device, upon activation of the installation option; and using the third software for executing the removed function on the control device.

7. The method of claim 6, further comprising:
determining, whether content data were stored with regard to the function that is executable based on the third software; and
providing the stored content data by a storage device for the control device, if the content data were stored with regard to the function that is executable based on the third software.

8. A motor vehicle comprising a control device, wherein the control device is configured to:
determine usage data describing a usage behavior for a function of a plurality of functions using a first software provided to the control device;
check, whether the usage data for the function is below a predetermined minimum usage based on the determined usage data;
based on the determining, using the checking, that the usage data for the function is below the predetermined minimum usage, provide a removal option for removing the function from the control device for the function;
uninstall the function for removal of the function from the control device;
in response to activating the removal option, provide a second software for the control device having a respective removed function in a non-executable state; and
operate the control device using the second software.

9. A method for operating a control device for a motor vehicle, the method comprising:
determining usage data describing a usage behavior for a function of a plurality of functions using a first software provided to the control device;
checking, whether the usage data for the function is below a predetermined minimum usage based on the determined usage data;
based on the determining, using the checking, that the usage data for the function is below the predetermined minimum usage, providing a removal option for at least partially removing the function from the control device;
establishing a communication connection between a communication interface of the motor vehicle and a communication interface of an external computing device;
transmitting request data describing an activated removal option via the communication connection to the external computing device;
receiving, by the motor vehicle, a second software generated based on the transmitted request data;
in response to activating the removal option, providing the second software for the control device having a respective removed function in a non-executable state; and
operating the control device using the second software.

10. A motor vehicle comprising a control device, wherein the control device is configured to:
determine usage data describing a usage behavior for a function of a plurality of functions using a first software provided to the control device;
check, whether the usage data for the function is below a predetermined minimum usage based on the determined usage data;
based on the determining, using the checking, that the usage data for the function is below the predetermined minimum usage, provide a removal option for at least partially removing the function from the control device for the function;
establish a communication connection between a communication interface of the motor vehicle and a communication interface of an external computing device;
transmit request data describing an activated removal option via the communication connection to the external computing device;
receive, by the motor vehicle, a second software generated based on the transmitted request data;
in response to activating the removal option, provide the second software for the control device having a respective removed function in a non-executable state; and
operate the control device using the second software.

* * * * *